(12) United States Patent
Yu et al.

(10) Patent No.: US 8,262,273 B2
(45) Date of Patent: Sep. 11, 2012

(54) INTEGRATED LIGHT GUIDE PLATE HAVING ENHANCED AXIAL LUMINOSITY

(75) Inventors: Jyh-Cheng Yu, Kaohsiung (TW); Shao-Tang Zhang Jian, Kaohsiung County (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 166 days.

(21) Appl. No.: 12/896,242

(22) Filed: Oct. 1, 2010

(65) Prior Publication Data

US 2012/0081926 A1    Apr. 5, 2012

(51) Int. Cl.
*F21V 7/04* (2006.01)
(52) U.S. Cl. .................. 362/615; 362/621; 362/626
(58) Field of Classification Search ........... 362/617–626
See application file for complete search history.

(56) References Cited

U.S. PATENT DOCUMENTS

2010/0142225 A1*  6/2010  Kurihara et al. .............. 362/621

\* cited by examiner

*Primary Examiner* — Jason Moon Han
(74) *Attorney, Agent, or Firm* — Rosenberg, Klein & Lee (57) ABSTRACT

An integrated light guide plate having axial directional luminance distribution has a substrate. The substrate has a light incident plane, a light emission plane and a bottom surface opposite to the light emission surface. The light incident plane has a plurality of V-cuts formed thereon to serve as prisms. The included angle of the V-cuts is between 85° and 105°. A plurality of pyramidal recesses is formed on the bottom surface of the substrate. Given the formation of the V-cuts and the pyramidal recesses, the integrated light guide plate of the present invention provides an enhanced axial luminous intensity without requiring additional diffuser sheets and prism sheets. Accordingly, the integrated light guide plate has a good directional axial luminance.

4 Claims, 9 Drawing Sheets

INTEGRATED LIGHT GUIDE PLATE HAVING ENHANCED AXIAL LUMINOSITY

BACKGROUND OF THE INVENTION

1. Field of the Invention

The present invention is related to an integrated light guide plate, and more particularly to an integrated light guide plate applied to a backlight module to enhance axial luminosity with microstructures formed on the plate.

2. Description of the Related Art

Figure 5:
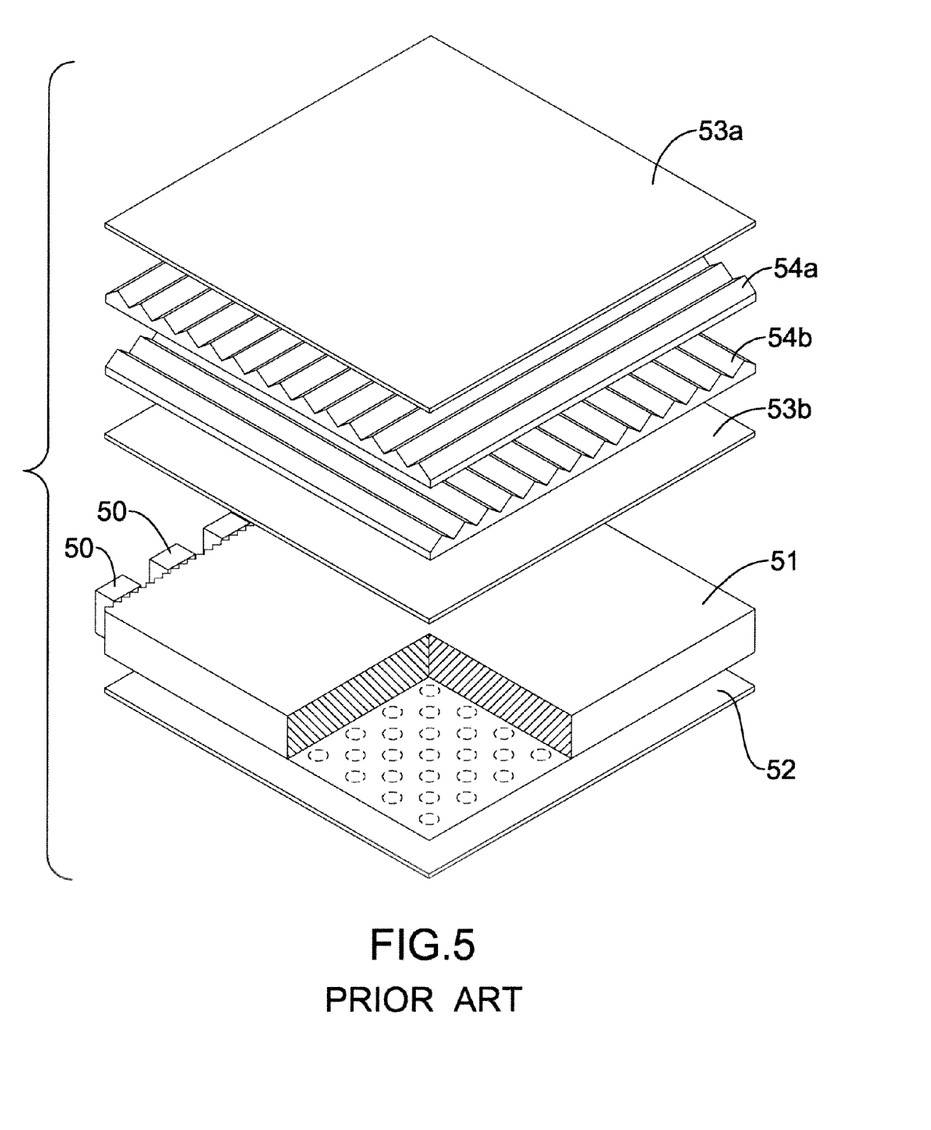
FIG. 5 is an exploded perspective view of a conventional backlight module.

A backlight module plays a critical role in an active matrix light crystal display. With reference to FIG. 5, a typical backlight module has a light source 50, a light guide plate (LGP) 51, a reflector sheet 52, two diffuser sheets 53a, 53b and two prism sheets 54a, 54b. The light source 50 is formed by either a cold cathode fluorescent lamp (CCFL) or light emitting diodes (LED). A point light source or line light source can be converted into a surface light source through microstructures formed on the LGP 51.

Light-emitting luminance distribution of the LGP 51 could become uneven as a result of the geometrical design of the microstructures. The lower diffuser sheet 53b serves to modify the emitting light into a Lambertian distribution. To improve the axial luminous intensity of a backlight module of a handheld display or personal display with limited luminance, a conventional measure uses the two orthogonally-distributed prism sheets 54a, 54b to collimate the emitting light axially. The collimated light further passes through the upper diffuser sheet 53a to smoothen minor uniformity imperfections or possible Moiré fringes of back light.

According to the manufacturing methods, LGPs (51) can be classified into printed light guide plates and non-printed light guide plates. Printed LGPs are formed by printing a diffusive dot matrix onto plain polymer plates. Non-printed light guide plates are integrally formed with the microstructures by injection molding or hot embossing. Non-printed LGPs usually have a prominent optical performance, in comparison with printed LGPs using dot matrices, since the microstructures of the non-printed LGP do not turn yellowish as a result of prolonged exposure to light. Hence, non-printed LGPs have dominated small-to-medium back light modules (BLMs).

Usually, LGPs have a microstructure taking a form of V-cuts formed on a bottom surface thereof. As such microstructures can vary in density or size along one-dimensional direction, the LGPs having such microstructures are suitable for a CCFL light source. If LED is used as a light source, the distribution of the microstructures has to be varied in two dimensions as the illumination distribution of LEDs is similar to a point light source with a limited emitting angle. Hence, spherical dots and short V-slots become the most common microstructures for LED lit LGPs.

Figure 6:
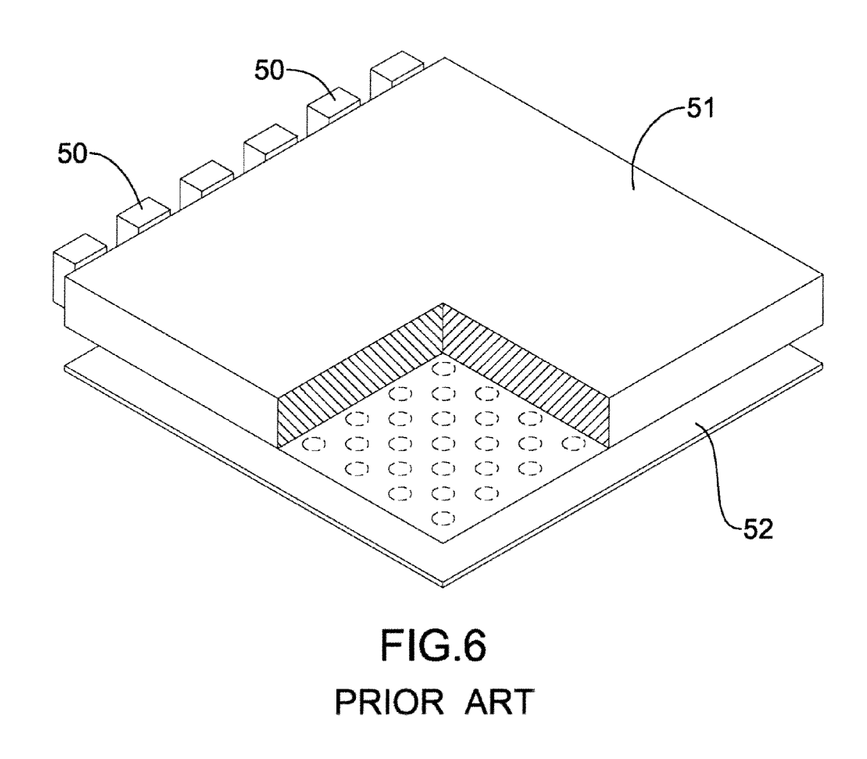
FIG. 6 is a perspective view of a first embodiment of a conventional light guide plate.

With reference to FIG. 6, a conventional LGP 51 has a microstructure in a form of multiple spherical bumps formed on and protruding from a bottom of the LGP 51, and LEDs are mounted on one edge of the LGP. When light enters the LGP 51, the light is emerged out of the light emission plane of the LGP 51 when subjected to reflection and deflection onto the microstructure. The light propagated by the spherical bumps is reflected and deflected, and then exits along non-specific directions, which might cause an asymmetrical luminance angular distribution.

Figure 7:
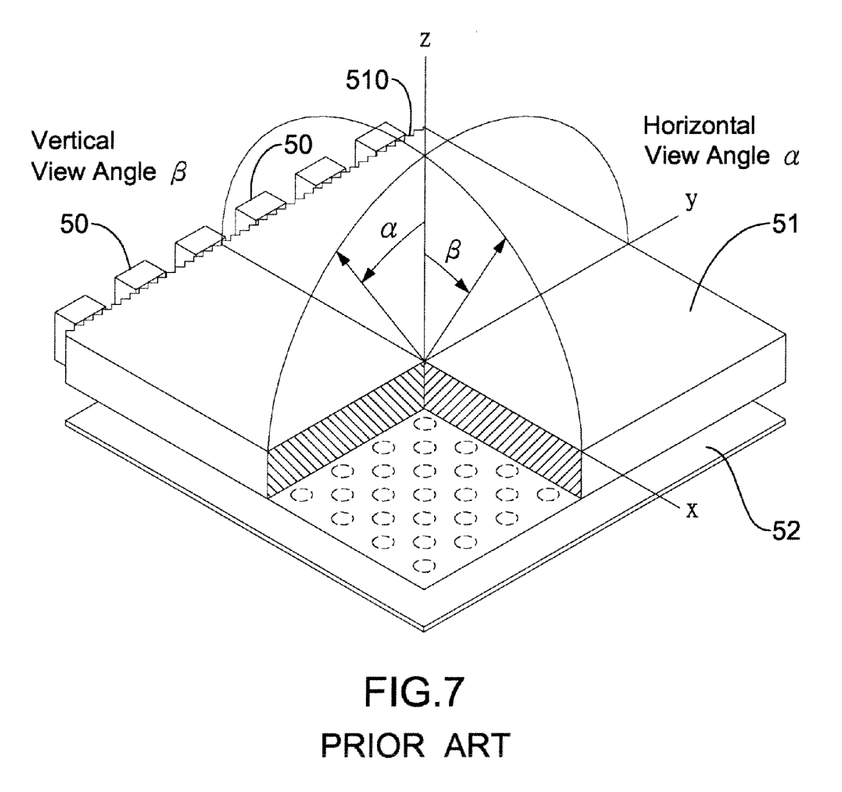
FIG. 7 is a perspective view of a second embodiment of the conventional light guide plate.

Certain optical elements such as prisms, convex and concave lens are designed on the edge-lit surface of the LGP to modify the emitting angle and intensity distribution of light sources. With reference to FIG. 7, to improve the aforementioned issue, the LGP 51 has a structure of V-cuts 510 formed on a light incident plane to expand a range of light emitting angle of the light source. In addition, a lower diffusive sheet is often applied on the top of LGP 51 to modify the luminous intensity into a Lambertian distribution.

With further reference to FIG. 7, two luminance angular distributions in vertical and horizontal directions, are measured from the front surface of LGP. A horizontal view angle α is measured in the y-z plane from a surface normal of LGP, and a vertical view angle β is measured in the x-z plane from a surface normal of LGP. The axial luminous intensity is the intensity measured at the surface normal direction in the z direction, i.e. α=β=0.

Figure 8:
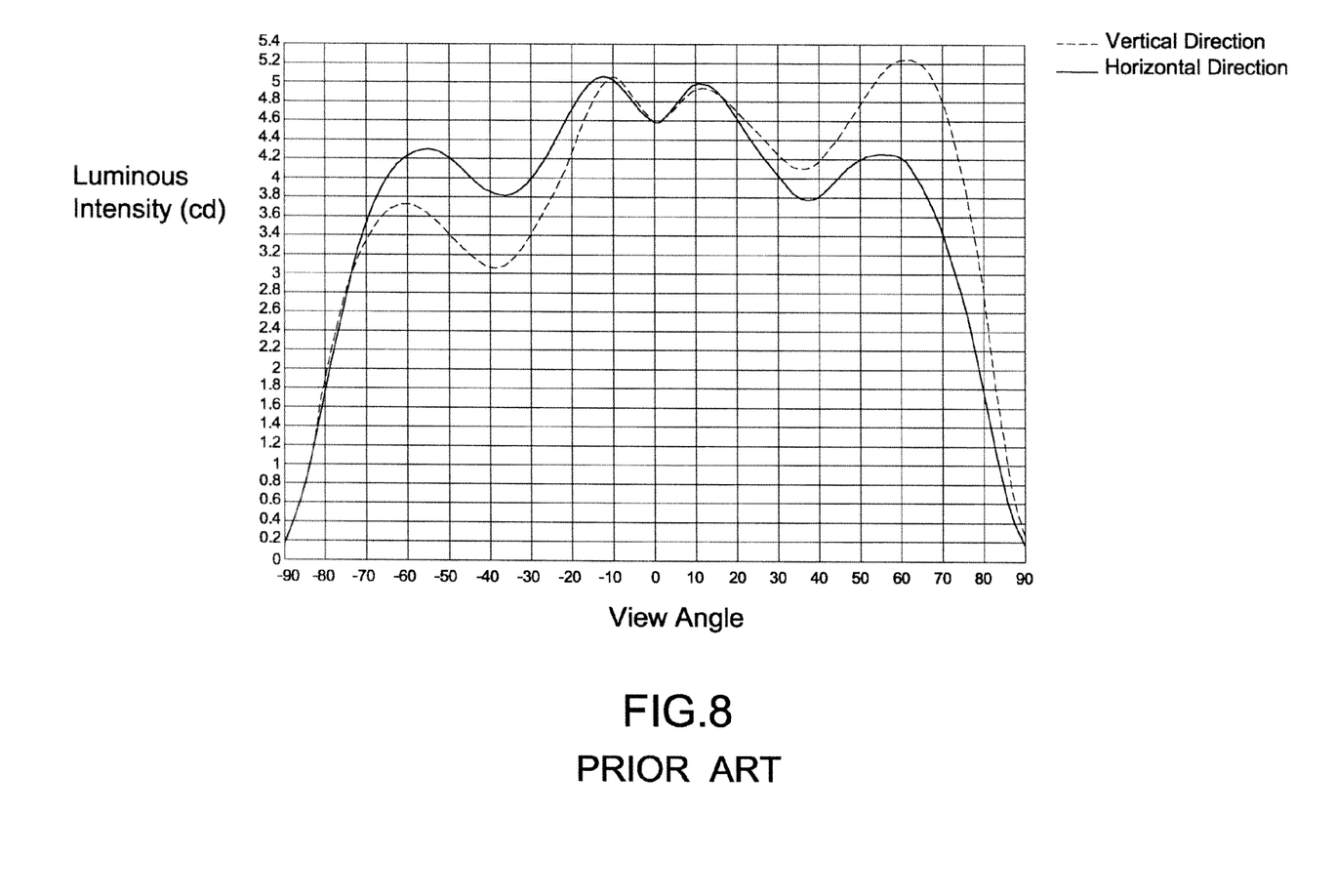
FIG. 8 is a chart of the angular distribution of luminosity of the light emitted from the front surface of the conventional light guide plate in FIG. 7.

With reference to FIG. 8, a LGP having a microstructure of spherical bumps on a bottom and prisms on the light incident plane thereof has an asymmetrical luminance angular distribution in vertical angles. The axial luminous intensity is not the highest. The peak intensity appears at vertical angle β=60°. For a personal electronic apparatus with a liquid crystal display, a narrow luminance angular distribution with peak intensity at the normal direction is preferred to increase the up-front brightness.

Figure 9:
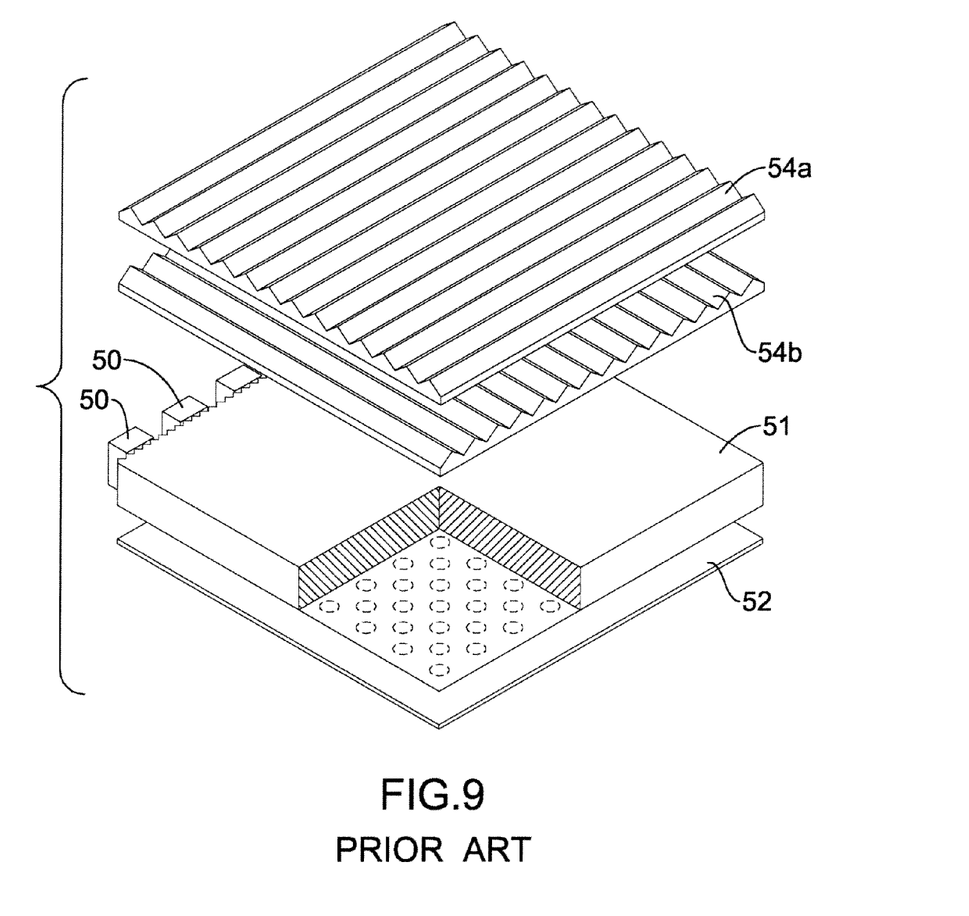
FIG. 9 is an exploded prospective view of a third embodiment of the conventional light guide plate.
Figure 10:
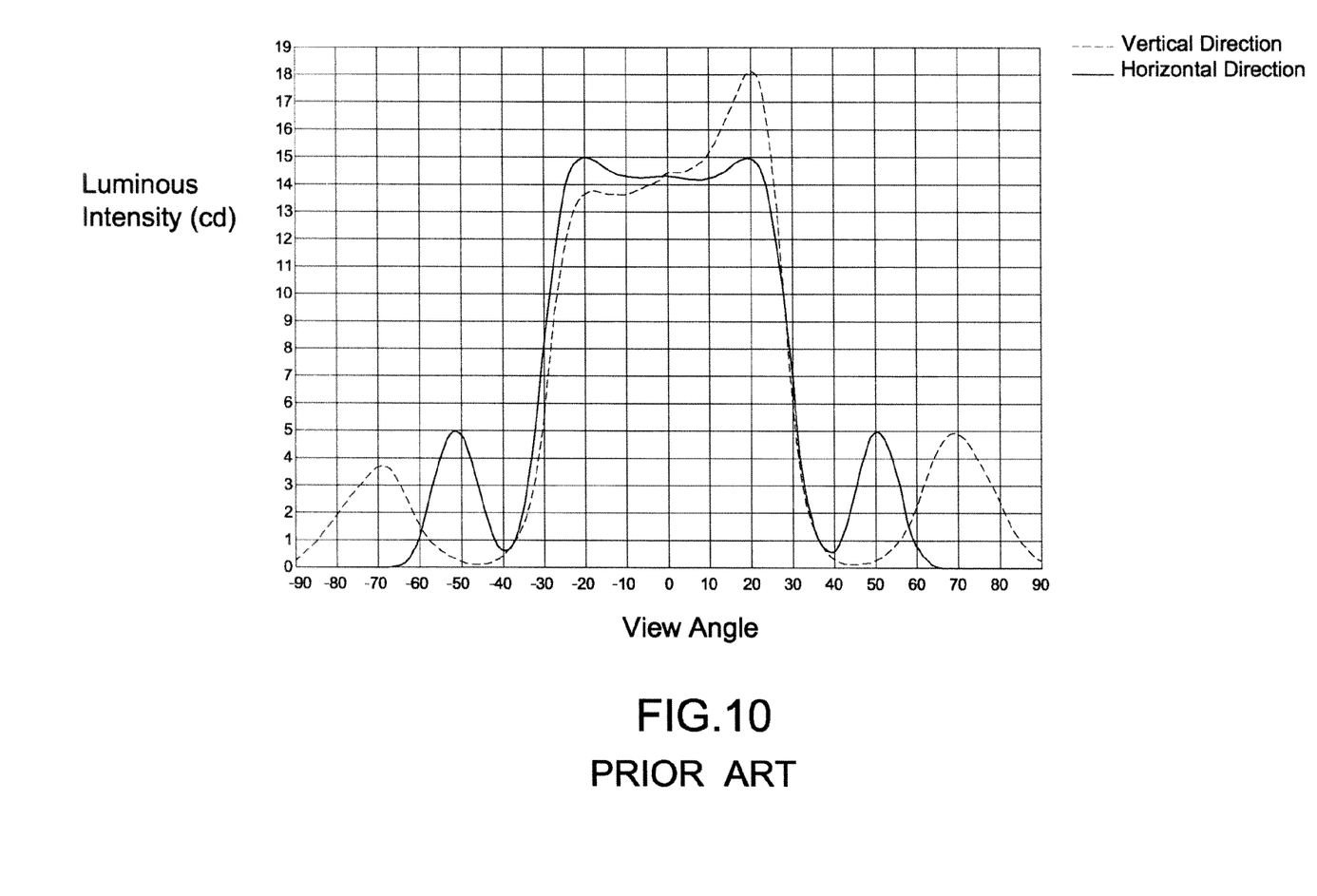
FIG. 10 is a chart of the angular distribution of luminosity of the light emitted from the front surface of the conventional light guide plate in FIG. 9.

With reference to FIG. 9, if two orthogonal prism sheets 54a, 54b are mounted on the top of the LGP 51, the luminance angular distribution are collimated as shown in FIG. 10, and the axial luminous intensity increases to attain better personal viewing brightness. However, the peak intensity may appear off the surface normal of backlight module if the luminance angular distribution entering the prism sheets is asymmetrical.

Keeping abreast with the market demand, backlight modules tend to be slim, and light, and head for a goal of low power consumption and low cost. However, as disclosed earlier, conventional LGPs must be additionally equipped with the reflector sheet, the diffuser sheet and prism sheets to acquire more satisfactory emitting luminance. Besides, additional components cause a drop of light efficiency and run counter to the demands of lowering size, weight and cost of the backlight modules.

SUMMARY OF THE INVENTION

An objective of the present invention is to provide an integrated light guide plate having enhanced axial luminosity, which enhances axial directional luminance with microstructure formed thereon.

To achieve the foregoing objective, the integrated light guide plate has a substrate, a plurality of V-cuts and a plurality of pyramidal recesses.

The substrate has a light incident plane, a light emission plane and a bottom surface opposite to the light emission plane.

The plurality of V-cuts are formed on the light incident plane and serve as prisms, and each V-cut has a first angle ranging from 85° to 105°.

The plurality of pyramidal recesses are formed in the bottom surface of the substrate.

A reference line passing through one vertex of one of the pyramidal recesses is normal to one side of the substrate, and a second angle is defined between the reference line and an edge of a base of the pyramidal recess and ranges between 43° to 47°.

Given the combination and distribution of the V-cuts and the pyramidal recesses, the integrated light guide plate can provide emitting light with high intensity axially without requiring additional diffuser sheets and prism sheets.

DETAILED DESCRIPTION OF THE INVENTION

Figure 1:
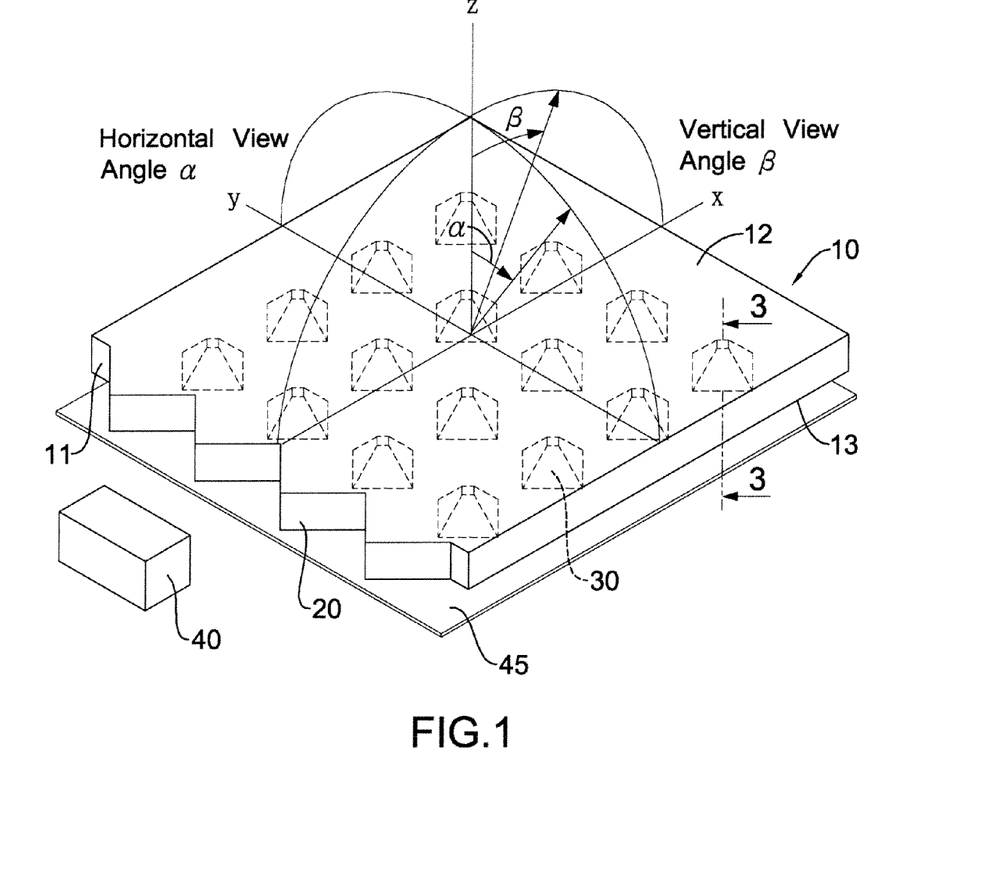
FIG. 1 is a perspective view of an integrated light guide plate in accordance with the present invention.

With reference to FIG. 1, an integrated LGP in accordance with the present invention applied to an edge-lit backlight module has a transparent substrate 10. The substrate 10 has a light incident plane 11, a light emission plane 12 and a bottom surface 13 opposite to the light emission plane 12. A light source 40 is mounted beside the light incident plane. As the present embodiment employs multiple LEDs as a light source, a reflector sheet 45 may be mounted on the bottom surface 13 of the LGP for a physical application of the integrated LGP. A horizontal view angle α is measured in the y-z plane from a surface normal of LGP in the z direction, and a vertical view angle β is measured in the x-z plane from the surface normal of LGP. The axial luminous intensity is the intensity measured at the surface normal direction, α=β=0.

Figure 2:
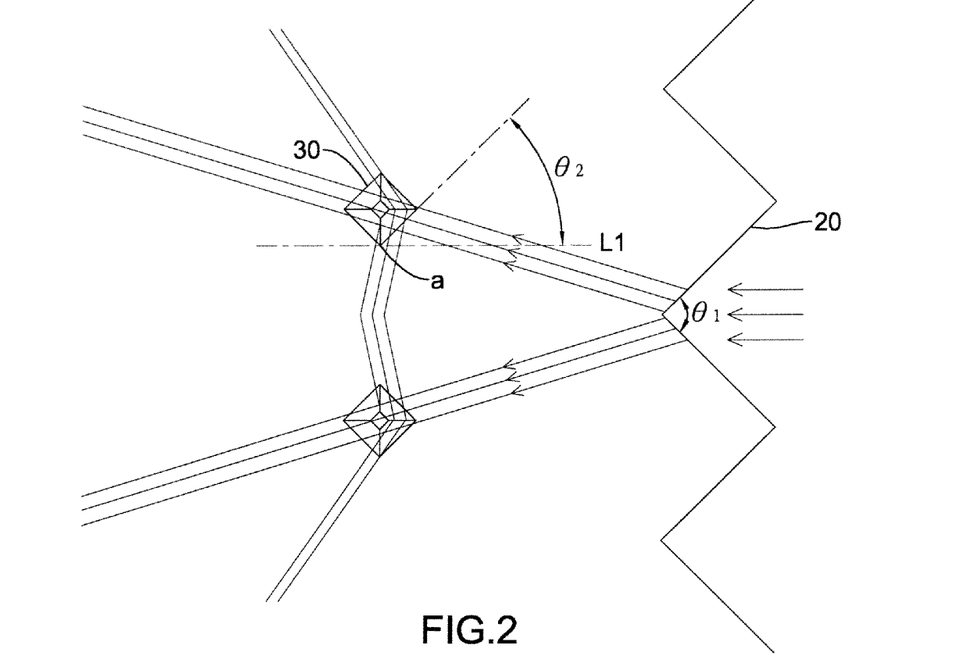
FIG. 2 is a schematic view of light paths of the integrated light guide plate in FIG. 1.
Figure 3:
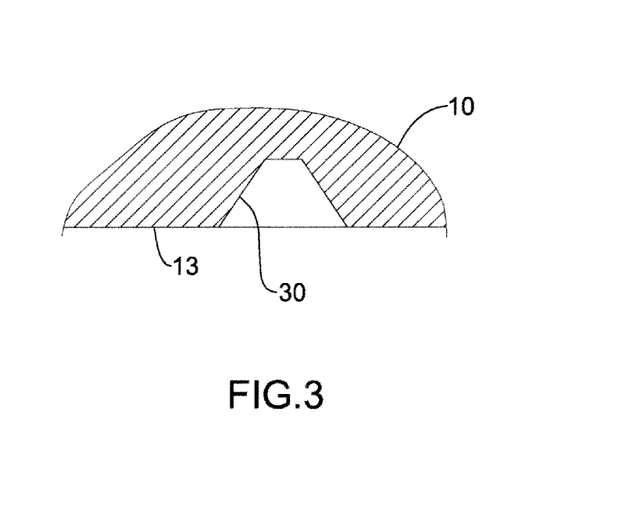
FIG. 3 is an enlarged cross-sectional view of a regular pyramidal recess of the integrated light guide plate in FIG. 1.

With reference to FIG. 2, the integrated LGP further has microstructures respectively formed on the light incident plane 11 and in the bottom surface 13. The microstructure on the light incident plane 11 pertains to a plurality of V-cuts 20. The plurality of V-cuts is mutually connected and serves as a prism. An angle defined between each V-cut 20 is a first angle $\theta_1$. The first angle $\theta_1$ ranges between 85° to 105°. With reference to FIG. 3, the microstructure in the bottom surface 13 pertains to a plurality of pyramidal recesses 30 formed in the bottom surface 13. The pyramidal recess 30 may be a truncated regular pyramidal recess rotated 43° to 47° from a reference line L1 passing through a vertex a and being perpendicular to one side of the substrate 10. The pyramidal recess 30 tapers from the bottom surface to atop of the pyramidal recess 30.

An angle between the reference line L1 and one edge of the base of the pyramidal recess 30 is defined as $\theta_2$. The $\theta_2$ ranges from 43° to 47°. In the present embodiment, the pyramidal recess 30 is a truncated regular pyramidal recess fabricated by using anisotropic wet etching defined by the [100] crystal plane and an etch stop.

Figure 4:
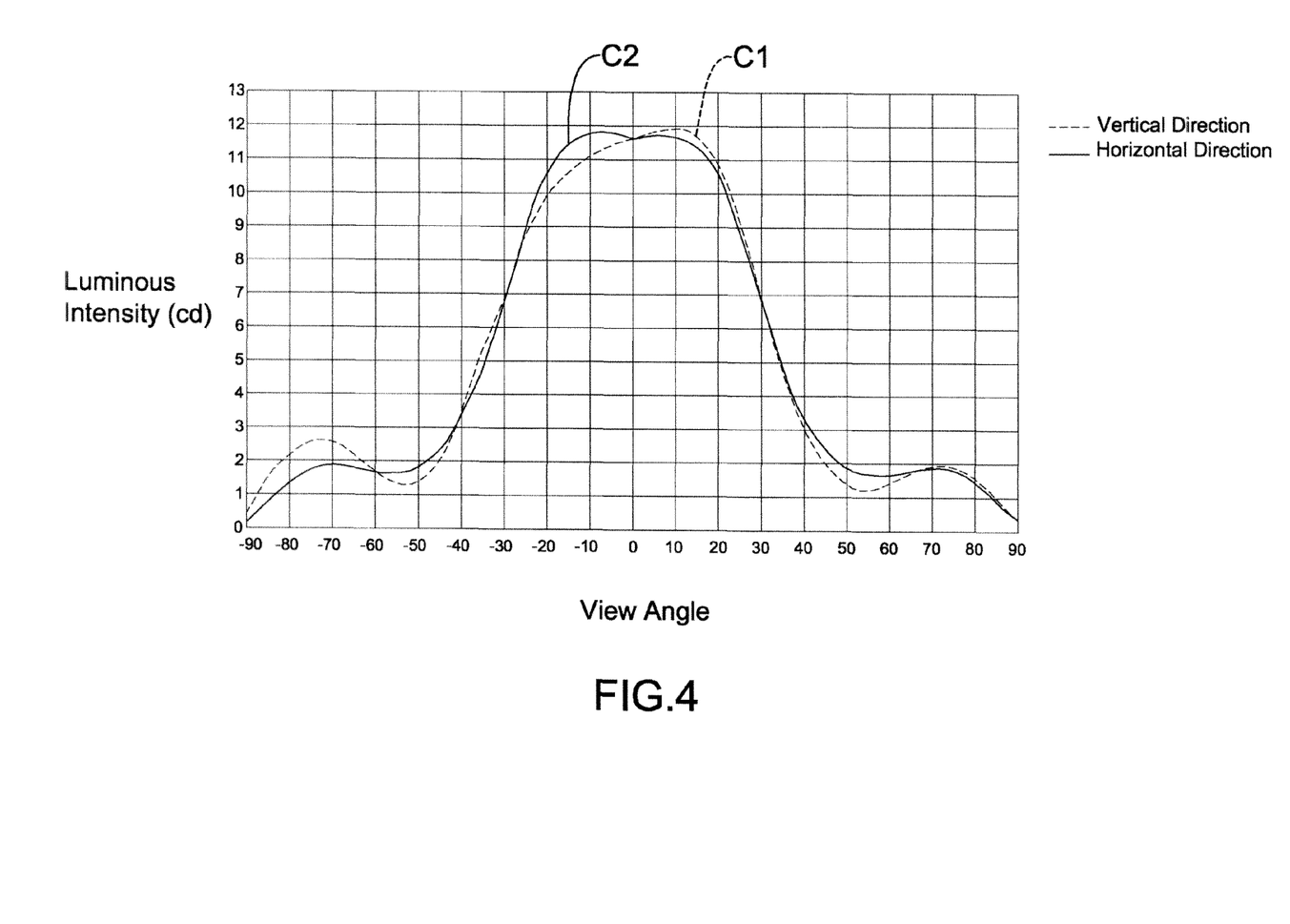
FIG. 4 is a chart of the angular distribution of luminosity of the light emitted from the front surface of the integrated light guide plate in FIG. 1.

Given the first angle $\theta_1$ being 90° and the second angle $\theta_2$ being 45°, a light effect can be observed in the view angles α and β as shown in FIG. 1. Starting from the horizontal view angle α, an emission light intensity distribution is symmetrical as the horizontal view angle α is normal to the direction where light propagates. Further because an edge of the base of the pyramidal recess 30 rotates 45° relative to a side of the substrate 10, after entering from the light incident plane 11 of the LGP 10, light is further reflected and deflected due to the spectrophotometric effect of the prism structure. Accordingly, light is easily projected onto the faces of the pyramidal recesses 30 to generate a light focusing effect. With reference to FIG. 4, when the first angle $\theta_1$ of the V-cuts is 90°, a best axial luminous intensity curve, namely C2, is present.

Followed by the vertical view angle β, the corresponding axial luminous intensity curve is C1. Similar to the interpretation for the horizontal view angle α, when the first angle $\theta_1$ of the V-cuts is 90°, the light energy loss due to the side lobes located around angle β=±70° is minimized, and thus the light focusing effect is more noticeable, which produces a highest axial luminous intensity.

With reference to Table 1, the first angle $\theta_1$ is incremented from 70° to 110° by 5° at a time. According to the simulation data listed in Table 1, when the first angle $\theta_1$ is gradually incremented from 70° to 110°, the axial luminous intensity is demonstrated as a curve, and the highest value is about 11.4. Varying the first angle has minor influence on the axial luminous intensity and the average luminance. Hence, an apex angle of incident light or the first angle $\theta_1$ can be determined by the values of the axial luminous intensity. The acceptable range of the first angle $\theta_1$ is 85° to 105°.

TABLE 1

| | $\theta_1$ | | | | | | | | |
| --- | --- | --- | --- | --- | --- | --- | --- | --- | --- |
| | 70° | 75° | 80° | 85° | 90° | 95° | 100° | 105° | 110° |
| Axial luminous intensity (cd) | ~10.7 | ~10.8 | ~11 | ~11.2 | ~11.3 | ~11.4 | ~11.4 | ~11.3 | ~10.7 |
| Light efficiency (%) | 84.8 | 85.1 | 85.3 | 85.3 | 85.3 | 85.5 | 85.6 | 85.6 | 85.5 |
| Average luminance (lux) | 5456 | 5478 | 5491 | 5498 | 5500 | 5510.7 | 5519.9 | 5517.7 | 5511.9 |
| Luminance RMS | 376.5 | 388.3 | 398.1 | 402.2 | 408.3 | 395.9 | 399.8 | 398.6 | 393.4 |

With reference to Table 2, observe the simulation data of the table by incrementing the rotation angle $\theta_2$ of the pyramidal recess 30 from 35° to 45° by 2° at a time. As the rotation angles $\theta_2$ from 35° to 43° are not symmetrical relative to an LED lighting plane, the light intensity distribution leans to one side to lower the axial luminous intensity values. Varying the rotation angle $\theta_2$ has minor influence on the light efficiency and the average luminance. According to the variation of the axial luminous intensity, the best rotation angles $\theta_2$ of the pyramidal recess 30 is between 43° to 47° (45°±2°).

Instead of additionally requiring the upper and lower diffuser sheets and two prism sheets, the present invention employs the range of the rotation angle ($\theta_2$) of the pyramidal recess 30, 43°~47°, in collaboration with the first angle ($\theta_1$) of the V-cuts to enhance the axial luminous intensity. The goal of the integrated LGP is achieved and the production cost and the module thickness are also reduced. Meanwhile, as the integrated LGP of the present invention eliminates the use of the lower diffuser sheet and the two prism sheets, the loss of the light efficiency resulting from the use of optical sheets can be avoided.

TABLE 2

| | $\theta_2$ | | | | | |
| --- | --- | --- | --- | --- | --- | --- |
| | 35° | 37° | 39° | 41° | 43° | 45° |
| Axial luminous intensity (cd) | ~10 | ~10.4 | ~10.8 | ~11 | ~11.4 | ~11.4 |
| Light efficiency (%) | 85.8 | 85.8 | 85.6 | 85.6 | 85.4 | 85.3 |
| Average luminance (lux) | 5525.9 | 5527.1 | 5517.5 | 5513.7 | 5506 | 5500 |

With reference to Table 3, after comparing the simulation data of the LGP of the present invention and conventional LGPs without having any optical sheets, the axial luminous intensity of the integrated LGP of the present invention is about 2.6 times of that of the conventional LGPs without the optical sheets and is similar to that of the conventional LGPs equipped with the optical sheets.

TABLE 3

| | Conventional LGP without optical sheets | Conventional LGP having one diffuser sheet | Conventional LGP having two prism sheets | Integrated LGP |
| --- | --- | --- | --- | --- |
| Axial luminous intensity (cd) | ~4.6 | ~4.5 | ~14.3 | ~12 |

In sum, the integrated LGP not only avoids the use of optical sheets causing the drop of the light efficiency of LGPs, but also provides axial directional light luminance. To reduce the thickness and cost and enhance the light efficiency of LGPs, the integrated single-sheet LGP can be a better alternative to replace the conventional LGPs equipped with two more prism sheets.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An integrated light guide plate having enhanced axial luminosity, comprising:
   a substrate having a light incident plane, a light emission plane and a bottom surface opposite to the light emission plane;
   a plurality of V-cuts formed on the light incident plane and serving as a prism, each V-cut having a vertex with a first angle ranging from 85° to 105°; and
   a plurality of pyramidal recesses formed in the bottom surface of the substrate;
   wherein a reference line passing through one vertex of one of the pyramidal recesses is orthogonal to one side of the substrate, and a second angle is defined between the reference line and an edge of the pyramidal recess and ranges between 43° to 47°.

2. The integrated light guide plate as claimed in claim 1, wherein the pyramidal recess is a truncated regular pyramidal recess.

3. The integrated light guide plate as claimed in claim 1, wherein the pyramidal recess tapers from the bottom surface to a top of the pyramidal recess.

4. The integrated light guide plate as claimed in claim 2, wherein the pyramidal recess tapers from the bottom surface to a top of the pyramidal recess.

\* \* \* \* \*